Figure 1:
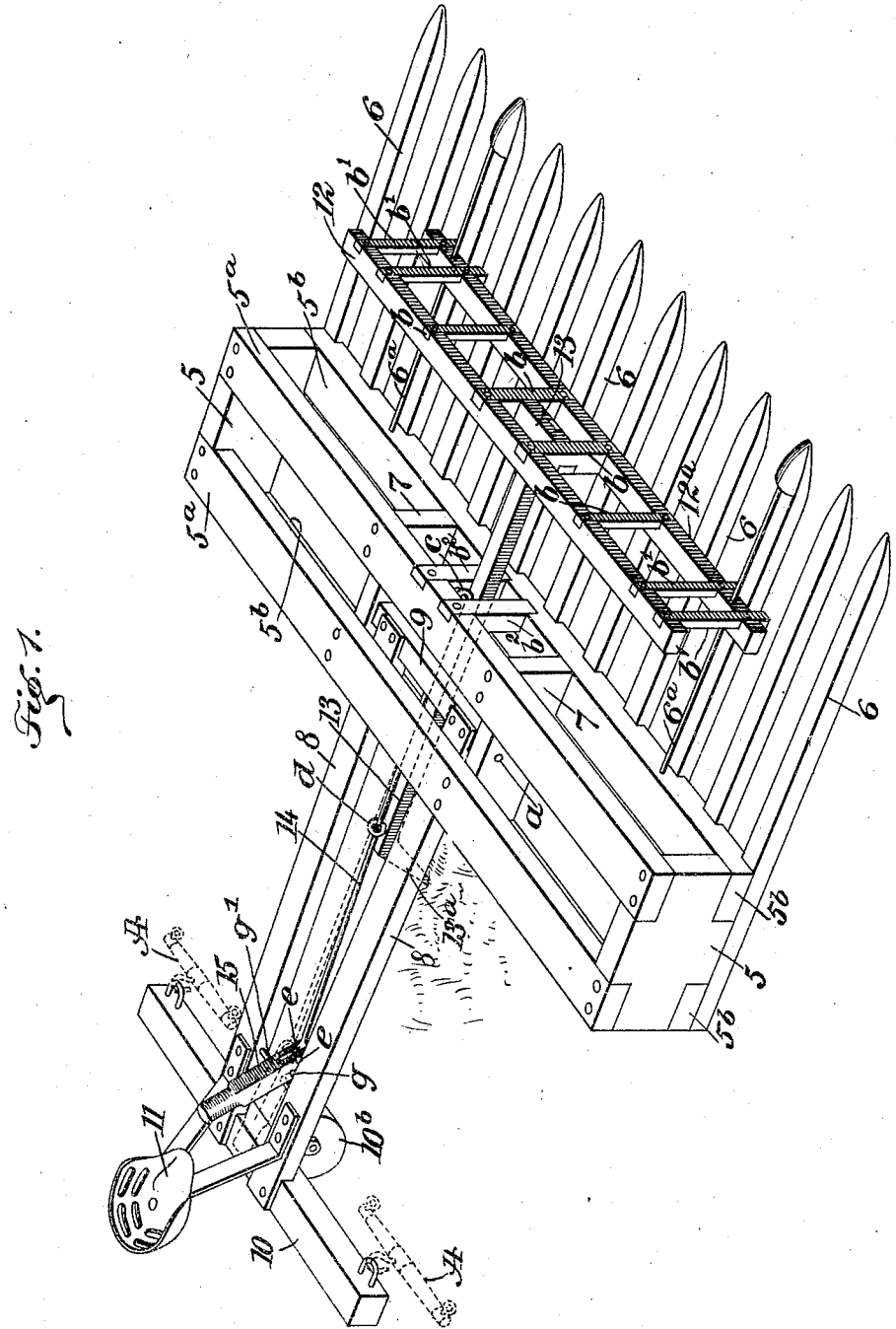

No. 788,264. PATENTED APR. 25, 1905.
J. R. JUDGE.
HAY SWEEP ATTACHMENT.
APPLICATION FILED JAN. 24, 1905.

2 SHEETS—SHEET 1.

WITNESSES:

INVENTOR
James R. Judge
BY
ATTORNEYS

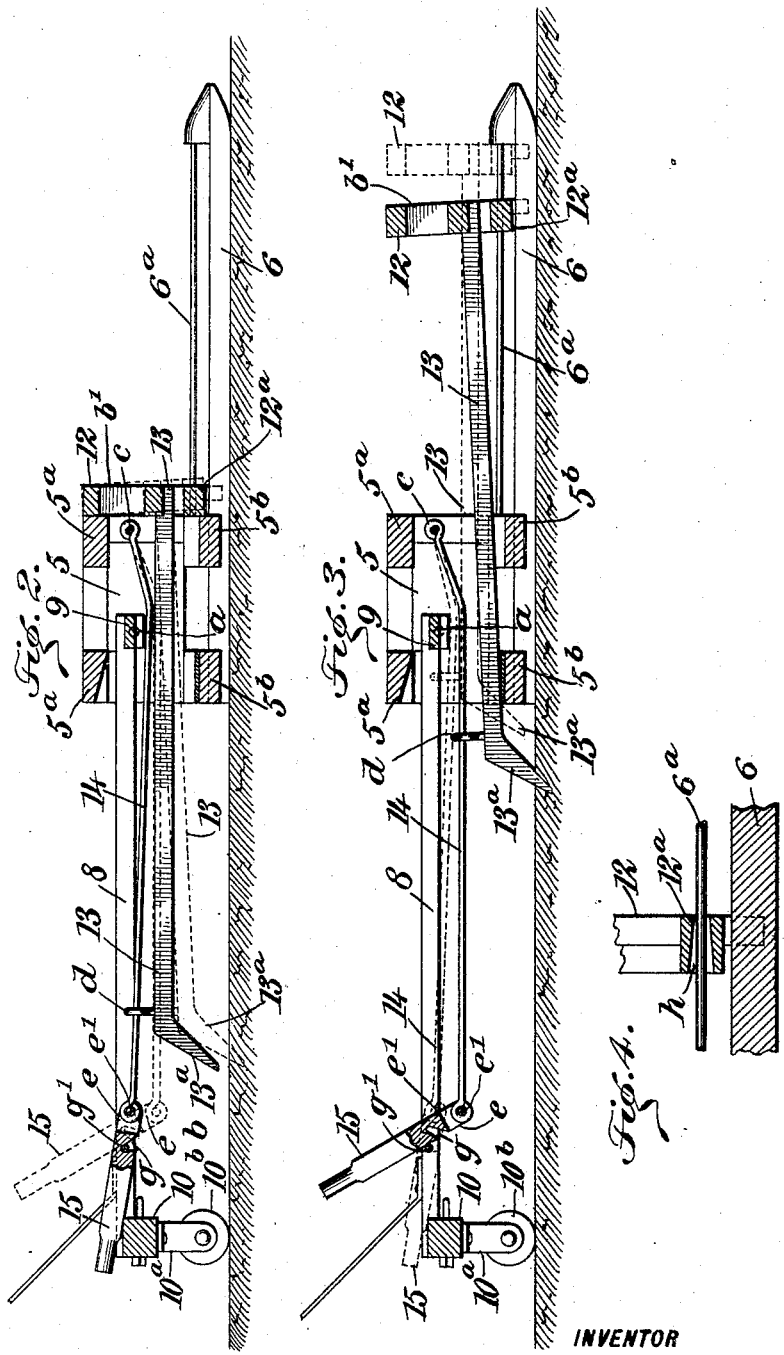

No. 788,264.

Patented April 25, 1905.

UNITED STATES PATENT OFFICE.

JAMES R. JUDGE, OF ANSELMO, NEBRASKA.

HAY-SWEEP ATTACHMENT.

SPECIFICATION forming part of Letters Patent No. 788,264, dated April 25, 1905.

Application filed January 24, 1905. Serial No. 242,522.

*To all whom it may concern:*

Be it known that I, JAMES R. JUDGE, a citizen of the United States, and a resident of Anselmo, in the county of Custer and State of Nebraska, have invented a new and Improved Hay-Sweep Attachment, of which the following is a full, clear, and exact description.

In localities where hay is harvested in large quantities it is customary to store it in stacks built to a considerable height by stacking-machines that are supplied with loads of the hay for elevation into position on the stack by an implement known as a "sweep," that is drawn or pushed over the field where hay has been cut and cured, so as to gather a load, that is transferred to the receiving-tines of a stacker of usual or improved construction.

The sweep as ordinarily constructed in depositing a load of gathered hay on the stacker is liable to withdraw part of the load when the sweep is removed from the stacker, causing loss of time and extra work to replace the hay for elevation.

The object of my invention is to provide a novel attachment for a hay-gathering sweep which will effect a proper deposit of a load of hay from the sweep onto the stacker and prevent the dislodgment of any portion of the load upon withdrawing the sweep from the stacker, which will expedite the work and lessen the labor entailed in operating a stacker and sweep.

The invention consists in the novel construction, combination, and arrangement of parts, as is hereinafter described, and defined in the appended claims.

Reference is to be had to the accompanying drawings, forming a part of this specification, in which similar characters of reference indicate corresponding parts in all the figures.

Figure 1 is a perspective view of a hay-sweep embodying the improvement. Fig. 2 is a longitudinal sectional view showing details of the invention arranged in two positions by full and broken lines. Fig. 3 is a longitudinal sectional view of the improvement, showing parts in different adjustment from that represented in Fig. 2; and Fig. 4 is a sectional side view of a detail that is a feature of the invention.

The hay-gathering sweep shown complete in Fig. 1 and that embodies the improvement consists, essentially, of the following details: An elongated frame is provided for the support of other parts in relative positions and comprises two end blocks 5 5, spaced apart by two upper bars $5^a$ and similar lower bars $5^b$, secured by their ends on the corners of the blocks 5. Upon the lower bars $5^b$ a series of fork-teeth 6 is secured, these teeth being spaced apart equally and held to project a suitable distance forwardly in the same plane, thus affording a level upper surface for the series, the lower edges of the teeth being shaped to slide on the ground.

Between the upper and lower frame-bars $5^a$ $5^b$, preferably at an equal distance from the end blocks 5, two bracket-pieces 7 7 are secured and serve to stiffen the frame of which they are portions. Two similar pusher-beams 8 8, of a suitable length, are held spaced apart at their front ends by the attachment of said ends upon a transverse rock-shaft 9, journaled at its ends in the respective bracket-pieces 7 7, as indicated at *a*. The other ends of the pusher-beams 8 are secured upon a cross-beam 10 at an equal distance from its ends, and upon said pusher-beams a driver's seat 11 may be mounted near the cross-beam.

Upon the lower side of the cross-beam 10, at its center of length, a bracket-frame $10^d$ is secured, wherein is pivoted a ground-wheel $10^b$, the frame and wheel having such height as will adapt them to maintain the pusher-beams 8 at a proper distance above the ground whereon the wheel $10^b$ travels.

Upon the teeth 6 is mounted a guard-frame 12, comprising two elongated strips that are spaced apart in parallel planes by a plurality of spaced stretcher-rungs *b*. There are two rungs $b'$ at each end of the guard-frame 12, which project below and at each side of a fork-tooth 6, thus preventing an endwise movement of said frame, that is adapted for reciprocation longitudinally of the teeth by the following means:

Upon two spaced upright rungs *b*, that are nearest the longitudinal center of the guard-frame 12, a holder-bar 13 is secured by one end, this bar being extended rearward between two of the spaced posts $b^2$, that are vertically positioned near the longitudinal center of the sweep-frame at its front.

Above the holder-bar 13 one end $c$ of an elongated link-rod 14 is loosely secured and thence extends rearward between the beams 8, passing through a loop or ring-eye $d$, that projects upward from the holder-bar 13 near its rear end, and, as shown, a foot member $13^a$ is formed on said rear end of the holder-bar, which foot member tapers toward its free end and inclines rearward and downward for engagement with the ground, as will be further explained.

A handled lever 15 is pivoted near its lower end between the pusher-beams 8 by a cross-bar $g'$, as will presently be described, and the lower end of this lever is forked, providing two spaced ears $e$ thereon that support between them a cross-pin $e'$, whereon is pivoted the rear end of the link-rod 14.

It will be seen in Figs. 2 and 3 that a notch $g$ is formed in the rear side of the handle-lever 15 above the ears $e$, inclining rearward and downward for a hooked engagement with the cross-bar $g'$, which extends between the pusher-beams 8 in front of the seat 11, and it will be noticed in Fig. 2 that when the lever is hooked upon the cross-bar and rocked rearward this engagement will support the holder-bar 13 and foot $13^a$ thereon a short distance from the ground.

The guard-frame 12 is held to slide on the fork-teeth 6 by the guide-rods $6^a$, that extend from thickened ends of two of said teeth to the lower transverse bar $5^b$ of the sweep-frame that is nearest the main portions of said teeth, the lower strip $12^a$ of the guard-frame being perforated conically at two points for a loose reception of the guide-rods, one of said perforations $h$ appearing in Fig. 4.

As represented by dotted lines in Fig. 1, two swingletrees A are loosely secured upon the forward side of the cross-beam 10 to enable the proper engagement of draft-animals with the sweep when the implement is to be used, the pusher-beams 8 being of sufficient length to permit the free travel of the animals rearward of the sweep-frame.

Assuming that the handle-lever 15 has been hooked upon the cross-bar $g'$ and rocked rearward, as shown in Fig. 2, so as to hold the foot member $13^a$ of the holder-bar 13 clear of the ground, the implement may be drawn over a field strewed with new-mown hay and by an engagement of the tines 6 therewith gather a load of the hay thereupon, the guard-frame 12 then assuming the position shown in Fig. 2—that is, pressed rearward into contact with the sweep-frame. The sweep, with its load, is now drawn, or rather pushed, toward the load-receiving members (not shown) of a stacking-machine of approved construction, and the teeth 6, with their load, are mounted upon said receiving members.

When the teeth 6 are disposed on the stacker for a proper deposit of the load of hay thereon, the driver releases the handled lever 15, so as to permit the foot $13^a$ of the holder-bar 13 to drop down into engagement with the ground, as shown by dotted lines in Fig. 2. The team of draft-animals is now backed, so as to move the teeth 6 rearward beneath the guard-frame 12, that remains stationary, and as the sweep-teeth recede the load of hay thereon is pushed by the guard-frame from the fork-teeth upon the receiving portion of the stacker, on which the sweep-teeth have been mounted.

It will be seen that the guard-frame 12 prevents the escape of any portion of the hay that was carried by the sweep-teeth off of the stacker and insures a positive transfer of all the hay from one machine to the other. The reverse movement of the sweep while the foot $13^a$ of the holder-bar 13 is embedded in the ground causes the rear transverse member $5^b$ of the sweep-frame to impinge upon the sloping forward side of the foot and raise it from the ground, as is shown by dotted lines in Fig. 3, which adjustment correspondingly raises the link-rod 14 and handle-lever 15, as is in a like manner shown in the same figure. The handle-lever is now disposed for convenient manipulation and should be reëngaged with the cross-bar $g'$ and at the same time rocked rearward, thus securing the holder-bar 13 properly elevated for clearance of its foot $13^a$ from the ground, which will permit the free travel of the machine over the hay-field for gathering another load of hay, that is deposited on the stacker as hereinbefore described.

This attachment may with slight changes that fall within the scope of the invention be combined with sweeps that are already in use, or the entire machine may be built as herein shown and described.

Having thus described my invention, I claim as new and desire to secure by Letters Patent—

1. The combination with a hay-gathering sweep adapted for forward and rearward movement, of a guard-frame held to slide over the teeth of the sweep, a holder-bar on the guard-frame, adapted for engaging one end with the ground when the teeth of the sweep are drawn backward, and means for controlling the holder-bar.

2. The combination with a hay-gathering sweep having spaced fork-teeth at the front, pusher-beams for controlling the movement of the teeth and extended rearward, and means for connecting draft-animals to the beams, of a guard-frame seated transversely on the fork-teeth, guides engaging the guard-frame, a holder-bar projected rearward from the guard-frame and having a foot on its rear end adapted to rock into engagement with the ground, means for raising the foot from the ground, and means for releasably holding the foot raised.

3. The combination with a hay-sweep, comprising a transverse rectangular frame, spaced teeth projected forward from the frame at its lower side, two pusher-beams held to rock together at their forward ends on the sweep-frame, a cross-beam on rear ends of the pusher-beams and swingletrees on said cross-beam, of a transverse guard-frame over the teeth of the sweep and held to slide on guide-rods carried by certain of said teeth, a holder-bar extended rearward from the guard-frame through the sweep-frame, and having a rearwardly and downwardly extended foot thereon, a link-rod pivoted at its forward end upon the sweep-frame above the holder-bar and extended between the pusher-beams, a handle-bar pivoted on the rear end of said link-bar, the handle-bar having a hook thereon, and a cross-bar carried by the pusher-beams, whereon the handle-bar may be hooked and rocked.

4. The herein-described attachment for a hay-sweep, comprising a guard-frame adapted for reciprocation on the teeth of the sweep, a holder-bar projected rearward from the guard-frame at its center of length, said bar having a rearwardly and downwardly projecting tapered foot on its free rear end, a link-rod loosely engaged with a projection on the holder-bar, and means for lifting or lowering the rear end of said link-rod and correspondingly moving the rear end and foot on the holder-bar.

In testimony whereof I have signed this specification in the presence of two subscribing witnesses.

JAMES R. JUDGE.

Witnesses:
W. E. WARREN,
C. E. BOSS.